Figure 1:
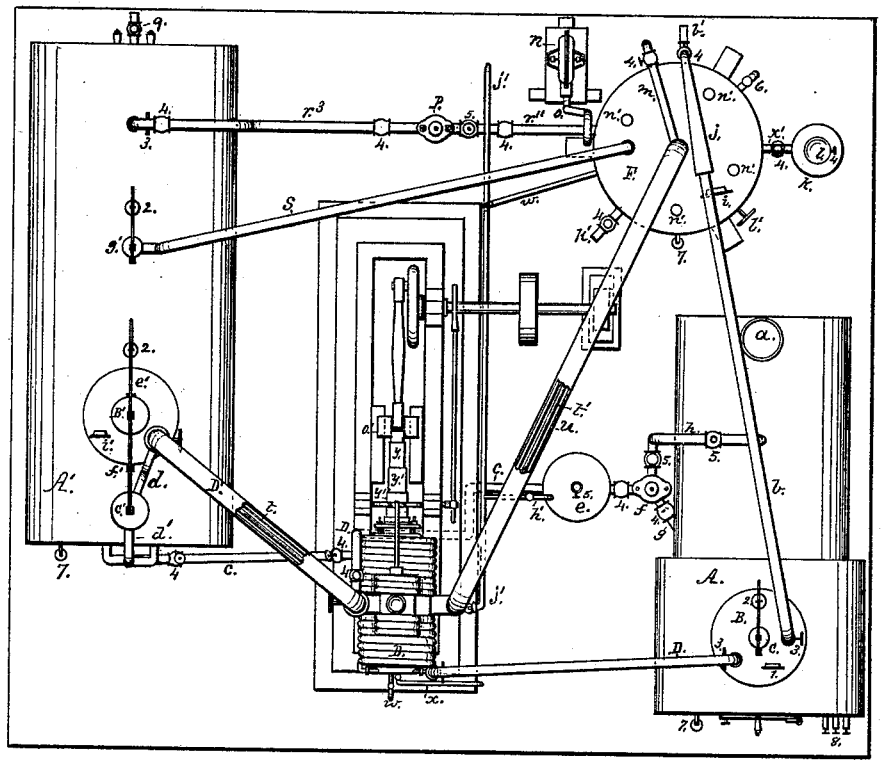

W. S. COLWELL.
Motor and Apparatus for Utilizing it.

3 Sheets—Sheet 1.

No. 220,220.   Patented Oct. 7, 1879.

Witnesses
J. J. Johnston
A. S. H. Johnston

Inventor
William S. Colwell

W. S. COLWELL.
Motor and Apparatus for Utilizing it.

No. 220,220. Patented Oct. 7, 1879.

3 Sheets—Sheet 2.

Witnesses
J. J. Johnston.
A. S. H. Johnston.

Inventor
William S. Colwell

W. S. COLWELL.
Motor and Apparatus for Utilizing it.

No. 220,220.  Patented Oct. 7, 1879.

3 Sheets—Sheet 3

Witnesses
J. J. Johnston.
A. S. H. Johnston.

Inventor
William S. Colwell

UNITED STATES PATENT OFFICE.

WILLIAM S. COLWELL, OF PITTSBURG, PENNSYLVANIA.

IMPROVEMENT IN MOTOR AND APPARATUS FOR UTILIZING IT.

Specification forming part of Letters Patent No. 220,220, dated October 7, 1879; application filed August 25, 1879.

*To all whom it may concern:*

Be it known that I, WILLIAM S. COLWELL, of Pittsburg, in the county of Allegheny and State of Pennsylvania, have invented a certain new and useful Improvement in Motor and Apparatus for Utilizing It; and I do hereby declare that the following is a full, clear, and exact description thereof, reference being had to the accompanying drawings, and to the letters of reference marked thereon.

The nature of my invention consists, first, in evolving bisulphide of carbon into a vapor for operating machinery by generating heat in a generator and transferring it into a vessel containing bisulphide of carbon, where, having performed its office, the refuse or unabsorbed heat is returned to the generator; second, in automatically conveying the generated heat from the generator into the vessel containing the bisulphide of carbon in quantity sufficient for evolving the bisulphide of carbon into a vapor of the required force for operating machinery requiring a given or fixed power; third, in heating the cylinder of the engine and its valve-chamber in the operation of conveying the heat from its generator to the vessel containing the bisulphide of carbon; fourth, in heating the pipe which conveys the vapor of the bisulphide of carbon from its chamber to the cylinder of the engine in the operation of transferring the heat from its generator to the chamber containing the bisulphide of carbon; fifth, in surrounding the exhaust-pipe of the engine with the overflowing water of the condenser; sixth, in a bisulphide-of-carbon engine, the method and means for exhausting air from the condenser for preventing the exhausted vapor of the engine reacting on the piston in the operation of exhausting from the cylinder; seventh, in the means of charging the bisulphide of carbon into its chamber; eighth, in inclosing the piston-rod of the cylinder of a bisulphide-of-carbon engine in a casing susceptible of being elongated and contracted in accordance with the inward and outward movement of the piston-rod, thereby excluding said rod from the direct action of the air, and avoiding loading it with vapor of the bisulphide of carbon; ninth, in the method and means of distributing air in the condenser for producing counter-currents of the water and carrying off the heat taken up by it; tenth, in coating the walls of the vessel used for evolving the bisulphide of carbon with tin that is impervious to the action of heated bisulphide of carbon.

To enable others skilled in the art with which my invention is most nearly connected, I will proceed to describe its construction and operation.

Figure 2:
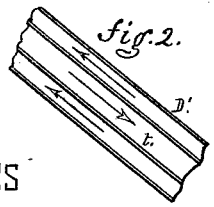
Figure 3:
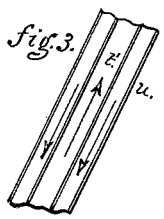
Figure 4:
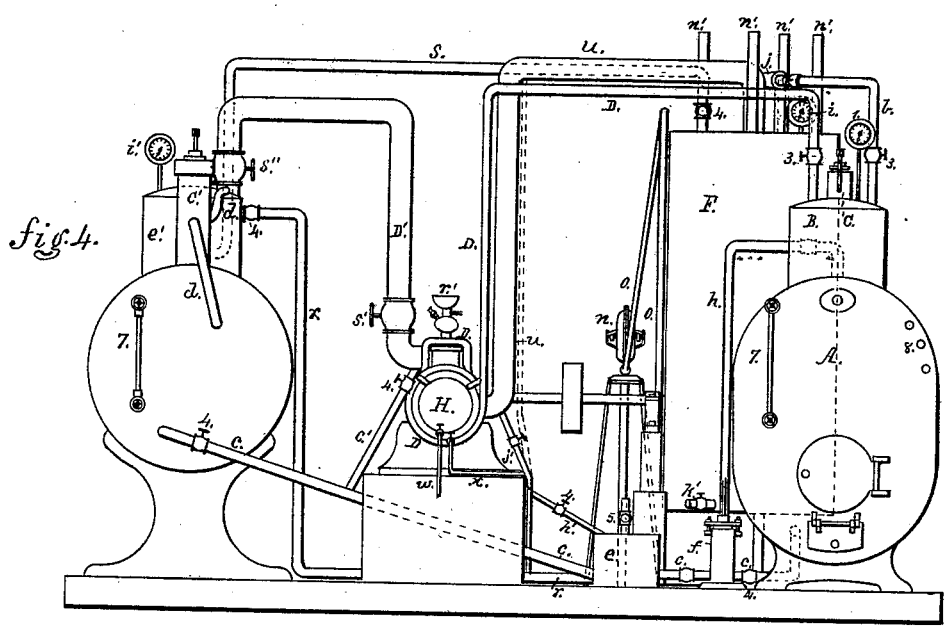
Figure 5:
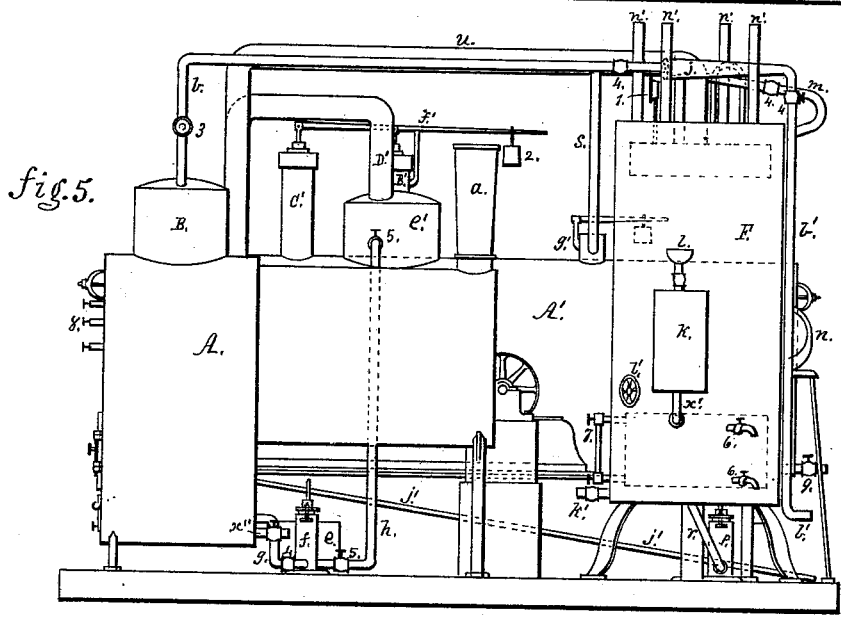
Figure 6:
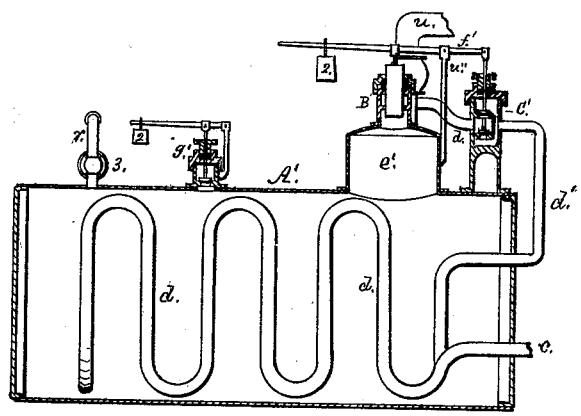
Figure 7:
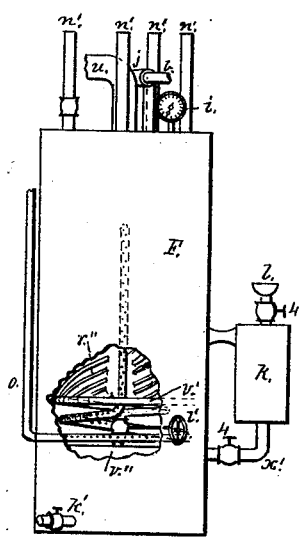
Figure 8:
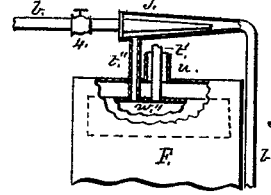
Figure 9:
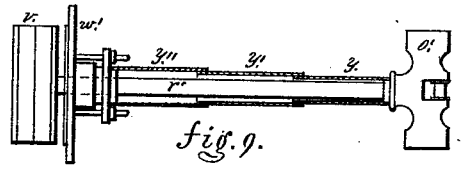

In the accompanying drawings, which form my specification, Figure 1 is a top view or plan of my improvement in apparatus for utilizing bisulphide of carbon for a motor. Figs. 2 and 3 are detail views of the pipes marked D' and $u$. Fig. 4 is an end view of my improvement in apparatus for utilizing bisulphide of carbon for a motor. Fig. 5 is a side elevation of the same. Fig. 6 is a vertical and longitudinal section of the chamber used for evolving the bisulphide of carbon into a vapor for a motor for operating machinery. Fig. 7 is a side view of the condenser which forms a part of my improvement in apparatus for utilizing bisulphide of carbon for a motor for operating machinery. Figs. 8 and 9 are detail views of parts of the said apparatus.

In the accompanying drawings, A represents an ordinary portable steam-boiler, having the usual appendages—viz., steam-dome B, safety-valve C, and water-indicator 7, gage-cocks 8, and blow-off valve $x''$.

From the steam-dome B passes a pipe, D, which coils around the cylinder H of the engine, encircling it and its steam-chest, and is enlarged at D', which part incases the pipe $t$, which conveys the vapor of the bisulphide of carbon from the chamber A' to the cylinder H of the engine.

The part D' of the pipe D is connected, by a pipe, $d$, to a valve-chamber, C', on the vapor-generating chamber A', which is, by pipe $d'$, connected to the chamber A', and, traversing it, passes out of said chamber, and is connected to a pipe, $c$, which passes downward and under the bed of the engine, and communicates with the water-tank $e$, which communicates, by means of a pipe, $c'$, with a force-pump, $f$, which communicates with the boiler A through the medium of pipe $g$, for supplying it with water.

The tank $e$ is connected to the waste-pipe $j'$ of the condenser by means of a pipe, $h'$, having valve 4, the former pipe being connected with the pipe $u$, leading from the condenser, and the latter pipe for supplying the tank $e$ with water when required.

To the steam-pipe D is attached a waste-pipe, $x$, for carrying off the products of condensation of steam that may take place in said pipe D.

The force-pump $f$ also communicates with the boiler A by a pipe, $h$, which is furnished with stop-valves 5 5, said pipe being used for supplying the boiler A with water when first starting, (usually termed "filling the boiler.")

The pipe $g$ is provided with a check-valve, 5, and is used for keeping up the necessary supply of water in the boiler A. From the dome B passes a pipe, $b$, provided with stop-valves 3 and 4, and enters the siphon $j$, to the outlet of which is connected a pipe, $b'$. The siphon $j$, by branch $t''$, is connected with the exhaust-chamber $w''$, suspended in the case F of the condenser.

To the under side of the exhaust-chamber is connected a series of pipes, $r''$, which connect with a circular pipe, $v'$, which communicates with a chamber, $v''$, which receives the bisulphide of carbon.

The circular pipe $v'$ is provided with a stop-valve, $l'$, for cutting off communication between the circular pipe $v'$ and the chamber $v''$, so that when exhausting air from the condenser or charging bisulphide of carbon into the chamber $v''$ the escape of the vapor of bisulphide of carbon will be avoided and the waste of it prevented.

The bisulphide of carbon is charged into the chamber $v''$ through the medium of a vessel, $k$, which communicates with said chamber by a pipe, $x'$, having a stop-valve, 4. On the upper end of the vessel $k$ is a funnel, $l$, having a stop-valve, 4.

The chamber $v''$ is furnished with a glass indicator, 7, placed on the outer wall of the case F of the condenser, and communicates with the chamber $v''$ by pipes, that pass through the wall of the case and connect with the lower and upper parts of the chamber $v''$, which is provided with draw-off valves 6 6, one at or near the top and the other at or near the bottom of said chamber, the latter being for drawing off the bisulphide of carbon, when it is desirable to do so, and the former being used for the purpose of drawing off water or other matter which may be floating on the surface of the bisulphide of carbon.

The case F of the condenser is provided with a pipe, $k'$, which is connected with a water-supply, and is also furnished with a flow-off pipe, $u$, which incases the exhaust-pipe $t'$, which communicates with exhaust-port of the engine and the chamber $w''$ of the condenser. The chamber $w''$ is furnished with a vacuum-gage, 1, for the purpose of indicating the amount of vacuum in said chamber and the pipes $r''$ connected to and communicating with it.

The chamber $v''$, used for holding the bisulphide of carbon, communicates with a force-pump by a pipe, $r''$, having a stop-valve, 5, and check-valve 4, and the force-pump communicates with the vaporing-chamber A' by a pipe, $r^3$, having check-valves 4 4 and stop-valve 3. The chamber $w''$, for receiving the exhaust, communicates with the valve-chamber $g'$ by a pipe, $s$, furnished with a stop-valve, 4.

To the upper end of the case F of the condenser is attached a series of pipes, $n'$, for carrying off vapor and heated air from the condenser. A fan, $n$, or other blast device, is connected with the case F by a pipe, $o$, which enters the case and forms a perforated coil, $v'$, terminating in a vertical branch in the center of the case F, as shown in Fig. 7.

The coil $v'$ and its vertical termination are so arranged with relation to the pipe $r''$ that the air forced through it will pass up on either side and between the pipes $r''$, thus causing counter-currents, that will displace the heated water next the pipe and bring colder water in contact with them, the air finally passing off through the pipes $n'$, carrying off the heat absorbed by the water in the operation of condensing.

To the cylinder H of the engine is attached a waste-pipe, $w$, furnished with a stop-valve. This pipe passes down, and, traversing a condenser placed in the bed of the engine, finally passes to the chamber $v''$, for the purpose of conveying the condensed (if any) bisulphide of carbon from the cylinder to said chamber.

The vaporizing-chamber A' is provided with a glass indicator for showing the quantity of bisulphide of carbon in said chamber. The chamber A' is furnished with a dome, $e'$, on which is placed a valve, B', the stem of said valve being connected to lever $f'$, which is pivoted to the upper end of a post, $u''$. To one end of the lever $f'$ is connected the stem of valve C', and on the other end of lever $f'$ is an adjustable weight, 2, which may be adjusted to the pressure desired in the chamber A', which pressure will be indicated by the pressure-gage $l'$ on the dome $e'$. If the pressure in chamber A' should become greater than that desired, it will force up the valve B', which will cause the lever $f'$ to close the valve C', and thereby cut off the supply of steam from the pipe $d'$, thereby allowing the heating power of said pipe to diminish, and with diminishing of the heat in chamber A' the pressure of the vapor will decrease, and when it has fallen to the point desired the weight 2, through the medium of lever $f'$, will lower valve B' and open valve C', and thereby admit steam into the pipe $d'$ for heating the bisulphide of carbon and evolving it into a vapor for a motor.

The piston-rod of the cylinder H is inclosed in a casing consisting of parts $y$, $y'$, and $y'''$, (shown enlarged in Fig. 9, in which $v$ is the piston-head; $r$, the piston-rod; $w'$, the cylinder-head; $o'$, the cross-head, and $y$, $y'$, and $y''$ the casing,) which close into each other like a telescope with the inward movement of the piston-rod $r$, and elongated by the outward movement of it. This casing is used for the purpose of preventing the direct action of the atmospheric air on the piston-rod, and for avoiding charging the air of the engine-room with the vapor of bisulphide of carbon. Every outward movement of the piston-rod $r$ is liable to carry with it out of the cylinder a small portion of bisulphide of carbon, which would in a very short time load the air of the engine-room with the vapor, making it noxious, and in some cases dangerous. By incasing the rod as described this is obviated.

The construction and arrangement of the several parts and the relation that they bear to each other will be readily understood from the foregoing description, and by reference to the accompanying drawings. I will therefore proceed to describe the operation, which is as follows: Steam is generated in the boiler A, and when the desired pressure is obtained the valves of the pipe D are opened, and the steam that passes through said pipe will heat the cylinder H and its valve-chamber, and passing into the enlarged part D' will heat the pipe $t$, which communicates with the vaporizing-chamber A' and the cylinder of the engine. The steam passing onward from the part D' will pass through pipe $d$ into the chamber of valve C', and passing from it will flow through pipe $d'$ in chamber A', where it will, through the medium of said pipe, heat the bisulphide of carbon and evolve it into a vapor for a motor. The condensed water of pipe $d'$ flows into pipe $c$, and through it into the tank $e$. The desired pressure of vapor being evolved in chamber A', and the chamber $v''$ charged with bisulphide of carbon, and case F filled with water, so as to overflow through pipe $u$, and the force-pumps $f$ and $p$ and the fan $n$ properly geared, the operator then opens the valves 3 of pipe $b$, which will cause steam to flow into the siphon $j$, which will exhaust air from the chamber $w''$ and pipes $r''$ of the condenser, forming in said chamber and pipes a partial vacuum, the air being carried off through pipe $b'$. Care should be taken to close the valve $l'$ before exhausting air from the chamber $w''$ and pipes $r''$; otherwise a waste of the bisulphide of carbon from the chamber $v''$ will follow. When the desired amount of vacuum is formed in the chamber $w''$ and pipes $r''$, which will be indicated by the vacuum-gage 1, the operator closes the valve 3 of the pipe $b$ and opens the valves $s'$ and $s''$ of the pipe $r$, which will allow the vapor to flow from chamber A' through the said pipe $t$ to the piston of the cylinder H, thereby moving it and operating the machinery harnessed to the engine.

The vapor, having performed its office in the cylinder H, is exhausted through pipe $t'$ into the chamber $w''$ and pipes $r''$ of the condenser, where it is condensed and flows down into the chamber $v''$. The air having been exhausted from the chamber $w''$ and pipes $r''$, as described, the engine will have a free exhaust without any back action of the exhaust-vapor on the piston.

It will be observed that the pipes $t'$ are surrounded with water overflowing from the condenser through pipe $u$, whereby the exhausted vapor is reduced in its temperature on its passage from the cylinder H to the condenser.

When it is desirable to transfer the bisulphide of carbon from the chamber A' to the chamber $v''$, the operator lifts the lever of the valve $g'$, which will open it and allow the vapor to pass through pipe $s$ to the condenser, where it is condensed and flows down into the said chamber $v''$, from which it may be drawn off at pleasure. By means of the valve $g'$, pipe $s$, and condenser the entire contents of chamber A' can be transferred to the chamber $v''$ by heating the bisulphide of carbon in said chamber A'.

The chamber in which the bisulphide of carbon is evolved into a vapor is coated with tin. By coating the walls of the chamber A' with said tin the durability of the said chamber will be greatly increased.

By generating steam in the boiler A and conveying it to the chamber A' through pipe D, arranged and combined with the several pipes and parts hereinbefore described, the bisulphide of carbon is evolved into a vapor for a motor with great economy of fuel and perfect safety, without loss of latent heat of the steam, which having performed its office in the chamber A', the refuse or unabsorbed heat is returned in the form of hot water to the boiler A.

The advantage of the method and means hereinbefore described for evolving the bisulphide of carbon into a vapor for a motor without the presence of fire at or near the vaporizing-chamber is a very important feature of my invention, the advantage and value of which cannot be overestimated in the use of bisulphide of carbon for the purposes of a motor.

Having thus described my improvement, what I claim as of my invention is—

1. In evolving bisulphide of carbon into a vapor for a motor for operating machinery, the method of generating heat in a generator and transferring it into a vessel containing bisulphide of carbon, where, having performed its office, the refuse or unabsorbed heat is returned to the heat-generator, substantially as herein described, and for the purpose set forth.

2. The method hereinbefore described for automatically conveying the heat from its generator into the chamber containing the bisulphide of carbon in quantity sufficient for evolving the necessary amount of the bisulphide of carbon into a vapor for a motor for the required power for operating machinery, the parts being arranged substantially as shown and described.

3. The valves B' and C', in combination with a vaporizing-chamber, whereby heat may be automatically admitted into said chamber for evolving bisulphide of carbon into a motor of the power desired for operating machinery, substantially as hereinbefore described.

4. The cylinder of an engine and its valve-chamber, heated by conveying heat from its generator into a coiled pipe surrounding the said cylinder, and to a vessel containing bisulphide of carbon for evolving it into a vapor for a motor for operating machinery, substantially as hereinbefore described.

5. The cylinder of an engine and its valve-chamber surrounded with the coiled pipe, which communicates with a heat-generator and a chamber for evolving bisulphide of carbon into a vapor for a motor for operating machinery, substantially as herein described, and for the purpose set forth.

6. The exhaust-pipe $t$, inclosed in the pipe $u$, whereby the temperature of the exhausted vapor from the cylinder H is reduced in its passage to the exhaust-chamber $w''$ by the overflow of water from the condenser, substantially as hereinbefore described.

7. The combination of the siphon $j$ and vacuum-gage 1 with the exhaust-chamber $w''$ and condensing-pipes $r'''$ of the condenser, substantially as herein described, and for the purpose set forth.

8. In a condenser for a bisulphide-of-carbon engine, the combination of the exhaust-chamber $w''$, pipes $r''$ $v'$, stop-valve $l'$, and chamber $r'''$, all arranged substantially as herein described, and for the purpose set forth.

9. In a bisulphide-of-carbon engine, the piston-rod $r'$, inclosed in a casing adapted to be elongated and contracted in accordance with the movements of said piston-rod with relation to its cylinder, substantially as herein described, and for the purpose set forth.

10. In a condenser for a bisulphide-of-carbon engine, the fan $n$, for creating an air-blast, in combination with the pipes $v'$ and $r'''$, arranged with relation to each other substantially as herein described, and for the purpose set forth.

11. In an apparatus for evolving bisulphide of carbon into a vapor for a motor for operating machinery, the evolving-chamber, having its walls coated with tin that is impervious to heated bisulphide of carbon, as herein described, and for the purpose set forth.

WILLIAM S. COLWELL.

Witnesses:
J. J. JOHNSTON,
A. S. H. JOHNSTON.